United States Patent
Yang

(10) Patent No.: US 11,404,731 B2
(45) Date of Patent: Aug. 2, 2022

(54) LEAD NEEDLE AND LEAD SLIME SEPARATOR FOR TREATING THIN LEAD GRID OF WASTE LEAD-ACID STORAGE BATTERY

(71) Applicant: JIANGSU NEW CHUNXING RESOURCE RECYCLING CO. LTD, Pizhou (CN)

(72) Inventor: Chunming Yang, Pizhou (CN)

(73) Assignee: JIANGSU NEW CHUNXING RESOURCE RECYCLING CO. LTD, Pizhou (CN)

( * ) Notice: Subject to any disclaimer, the term of this patent is extended or adjusted under 35 U.S.C. 154(b) by 1004 days.

(21) Appl. No.: 16/081,951

(22) PCT Filed: Jun. 12, 2017

(86) PCT No.: PCT/CN2017/087916
§ 371 (c)(1),
(2) Date: Sep. 3, 2018

(87) PCT Pub. No.: WO2017/215559
PCT Pub. Date: Dec. 21, 2017

(65) Prior Publication Data
US 2020/0266501 A1   Aug. 20, 2020

(30) Foreign Application Priority Data

Jun. 18, 2016 (CN) .......................... 201610433068.8

(51) Int. Cl.
*H01M 10/54* (2006.01)
*B02C 17/18* (2006.01)
(Continued)

(52) U.S. Cl.
CPC ......... *H01M 10/54* (2013.01); *B02C 17/1865* (2013.01); *B02C 17/24* (2013.01); *B03B 9/061* (2013.01); *B03B 2009/066* (2013.01)

(58) Field of Classification Search
CPC . B03B 9/061; B03B 2009/066; B02C 17/183; B02C 17/1855; B02C 17/186;
(Continued)

(56) References Cited

U.S. PATENT DOCUMENTS 4,013,233 A * 3/1977 Nylund .................. B02C 17/18
                                                          241/80
4,018,567 A * 4/1977 La Point .................. C22B 7/00
                                                         422/209
(Continued)

FOREIGN PATENT DOCUMENTS

CN   201493138 U   6/2010
CN   101979165 A   2/2011
(Continued)

OTHER PUBLICATIONS

Xinmin Tang, Study on Feeding and Discharging Device of Anqing Copper Mine Lattice Ball Mill, China Nonmetallic Minerals Industry, Feb. 25, 2013, 45-47, No. 01, Beijing.

*Primary Examiner* — Michael McCullough
*Assistant Examiner* — Kalyanavenkateshware Kumar
(74) *Attorney, Agent, or Firm* — Bayramoglu Law Offices LLC

(57) ABSTRACT

A lead needle and lead slime separator for treating thin lead grid of waste lead-acid storage battery, includes: a barrel body, corrosion-resistant and wear-resistant balls, a feed device, a bracket device, a discharge device and a driver. A feed hole is arranged at one end of the barrel body, a discharge port is arranged at the other end of the barrel body. The feed device is mounted at the feed hole, and the discharge device is mounted at the discharge hole. The
(Continued)

bracket device is connected to the barrel body, the driver is connected to the barrel body. The corrosion-resistant and wear-resistant balls are arranged in the barrel body. The separator can make the thin lead grid separation complete, clean and impurity-free. It does not need to be melted at high temperature in the melting furnace.

20 Claims, 6 Drawing Sheets

(51) Int. Cl.
    *B02C 17/24*    (2006.01)
    *B03B 9/06*    (2006.01)

(58) Field of Classification Search
    CPC ....... B02C 17/007; B02C 17/10; B02C 17/24; H01M 10/54
    See application file for complete search history.

(56) References Cited

U.S. PATENT DOCUMENTS

| | | | | |
|---|---|---|---|---|
| 4,267,980 | A * | 5/1981 | LaPoint | B03B 5/42 209/17 |
| 5,383,615 | A | 1/1995 | Calka et al. | |
| 6,024,226 | A * | 2/2000 | Olivier | B03B 9/061 209/172.5 |
| 6,378,704 | B1 * | 4/2002 | Krause | B03B 5/42 209/452 |
| 6,547,171 | B1 * | 4/2003 | Fontanille | B02C 17/183 241/171 |
| 2014/0054401 | A1 | 2/2014 | Macinnes et al. | |

FOREIGN PATENT DOCUMENTS

| | | |
|---|---|---|
| CN | 101979165 B | 2/2013 |
| CN | 103127985 A | 6/2013 |
| CN | 203316204 U | 12/2013 |
| CN | 203598947 U | 5/2014 |
| CN | 203599041 U | 5/2014 |
| CN | 203778148 U | 8/2014 |
| CN | 104014400 A | 9/2014 |
| CN | 204280559 U | 4/2015 |
| CN | 204911652 U | 12/2015 |
| CN | 205008058 U | 2/2016 |
| CN | 205056127 U | 3/2016 |
| CN | 205146346 U | 4/2016 |
| CN | 205308458 U | 6/2016 |
| CN | 205700835 U | 11/2016 |
| KR | 10-1147303 B1 | 5/2012 |

* cited by examiner

LEAD NEEDLE AND LEAD SLIME SEPARATOR FOR TREATING THIN LEAD GRID OF WASTE LEAD-ACID STORAGE BATTERY

CROSS REFERENCE TO RELATED APPLICATIONS

This application is the national phase entry of International Application No. PCT/CN2017/087916, filed on Jun. 12, 2017, which is based upon and claims priority to Chinese Patent Application No. 201610433068.8, filed on Jun. 18, 2016, the entire contents of which are incorporated herein by reference.

TECHNICAL FIELD

The present invention relates to a separator for treating waste lead-acid storage batteries, specifically relating to a lead needle and lead slime separator for treating thin lead grid of waste of lead-acid storage battery.

BACKGROUND

The waste lead-acid storage battery consists of the following parts: (1) waste electrolyte; (2) plates (positive plate, negative plate), the positive and negative poles in the battery are grids made of lead alloy, the surface of the positive plate is coated with metal lead powder, and the surface of the negative plate is coated with lead oxide powder; (3) storage battery case that is a trough body mainly made of PP, ABS and other plastics; (4) separators, mainly including microporous rubber separator, PVC plastic separators and paper scraps.

At present, domestic secondary lead factories are still using traditional pyrometallurgy. Some large lead factories have introduced crushing and sorting equipment from abroad with high costs. However, small secondary lead factories almost all use the reverberatory furnace mixing method that have no pretreatment and the production process thereof is that, after simple treatments of manual disassembly of the waste lead-acid battery, shelling, acid-removing and so on, the lead plate is sent to a reverberatory furnace and heated to 1200° C. for mixing.

The crushing and sorting technology of waste lead-acid storage has been studying abroad since the 1960s. At present, there are two representative sorting techniques: a crushing and sorting system developed by a European company and secondly, a crushing and sorting system developed by a company in the Americas, both have complete sets of equipment. The European crushing and sorting system has two main parts: the crushing and screening part and the hydraulic separator part. The following four components can be obtained from the treated waste lead-acid storage battery: lead paste or lead slime, metal lead scrap, polypropylene and separator. The American crushing and sorting system mainly has two parts: a metal lead sorter and an oxide stripping sorter. After sorting, four components are also obtained: lead paste or lead slime, metal lead scrap, polypropylene and separator. Their common shortcomings are: 1. The crushing and sorting systems can only be used to crush a single type of car-starting storage batteries at runtime, and cannot directly process the storage battery with ABS plastic case, and two or more types of waste storage batteries need to be manually classified, and then each type of waste storage batteries are crushed separately; 2. Metal lead scrap and other components cannot be completely separated, and the separator papers often contain fine lead scrap and lead slime, thus is easy to cause secondary pollution and waste of resources; 3. Due to the incomplete separation of lead grid and lead slime, a certain amount of lead slime is often entrained in the lead grid, and the separated lead grid must be processed in the smelting furnace, and the lead alloy cannot be obtained by direct melting at low temperature.

In the Chinese invention patent "a waste lead-acid battery crushing and sorting machine", authorization notice No. CN101979165B, the first-stage lead grid separation conveyor separates the lead grid and sends it to the second-stage lead grid separation conveyor. In the second-stage lead-grid separation conveyor, relying on the difference in material specific gravity, the lead grid with large particle size is obtained by being flushed by the flow of backwash water driven by the water pump, and the thick lead grid and the thin lead grid are classified and sorted by the impact force of the circulating water. However, in the thin lead grid and the lead needle separated by the separator, about 30% of the lead slime adheres to the thin lead grid and the lead needle, and is not easily separated. The lead yield rate is low when the thin lead grid and the lead needle adhered with the lead slime are melted directly at low temperature. And this part of the thin lead grid and lead needle need to be mixed with the lead slime for high-temperature melting, thus consuming high energy and wasting resources.

In the crushing and sorting process of waste lead-acid storage battery crusher, the battery is decomposed into components such as lead slime (lead paste), lead grid (thick lead grid, thin lead grid), PP or ABS plastics, separator paper, etc. by the crusher and the hydraulic separator. About 30% of the lead slime (lead paste) adhering to the surface of the thin lead grid (metal lead needle) is generally washed and flushed by water, but it is difficult to separate the lead slime from the surface of the thin lead grid (metal lead needle). For this part of the lead grid containing the lead slime, when they are smelted at high temperature, energy is wasted; when they are smelted at low temperature, the lead yield rate is low, the amount of the ash residue is high, the labor intensity of workers is large, and the valuable metals antimony and tin in the lead grid cannot be effectively utilized.

SUMMARY

The objective of the present invention is to provide a lead needle and lead slime separator for treating a thin lead grid of a waste lead-acid storage battery to solve the problem of the thin lead grid and the lead needle not being completely separated from the lead slime.

The technical solution of the present invention is realized as follows: the separator includes: a barrel body, corrosion-resistant and wear-resistant balls, a feed device, a bracket device, a discharge device and a driver. A feed hole is arranged at one end of the barrel body, a discharge port is arranged at the other end thereof, the feed device is mounted at the feed hole, and the discharge device is mounted at the discharge hole. The barrel body is connected to the bracket device, and the driver is connected to the barrel body, and the corrosion-resistant and wear-resistant balls are arranged in the barrel body.

The feed device includes: a feed hopper and a feed flushing water pipe. One end of the feed hopper extends to the feed hole of the barrel body, and the feed flushing water pipe is connected to the feed hopper.

The barrel body includes: a feed throat, a stop orifice plate, a discharge port, a waterstop ring and drum lining plates. The main body of the barrel body is a round tube, and the two ends of the barrel body are truncated cone-shaped tubes, and the diameter of the external port is smaller than the diameter of the round tube of the main body. The feed throat is connected to an end of the feed hole in the barrel body, and the stop orifice plate and the discharge port are connected to an end of the discharge hole in the barrel body. The water-stop ring is connected to an end of the discharge hole in the barrel body, and the drum lining plate is connected to a position of the main body in the barrel body. A plurality of drum lining plates are included and the drum lining plate is a rectangular shape. The rectangular drum lining plates are connected end to end, and are uniformly distributed in a polygonal shape in the barrel body.

The feed throat includes: an anti-spraying flange, a stop baffle and a feed homogenizer. The anti-spraying flange and the stop baffle are respectively connected at two ends of the truncated cone-shaped tube of a feed end of the barrel body, the anti-spraying flange is at the feed end, and the stop baffle is connected between the round tube of the main body and the truncated cone-shaped tube. The feed homogenizer is connected in the truncated cone-shaped tube. The feed homogenizer includes: distribution plates and a feed homogenizing barrel. The feed homogenizing barrel is a round tube, the diameter of the round tube is smaller than the diameter of the feed hole of the barrel body, one end of the round tube is closed, and the distribution plates are connected between the outside wall of the round tube and the inside wall of the barrel body. A plurality of distribution plates are included, and a shape of the section of the distribution plate is bent. When the barrel body is rotating in the forward direction, the distribution plates ensure that the material can only enter the barrel body, and lead slime in the barrel body cannot overflow from the barrel body.

The stop orifice plate is a conical plate, and round holes having diameters of 2-12 mm are distributed evenly thereon. The stop orifice plate is fixed in the inner side of the barrel body to ensure that the corrosion-resistant and wear-resistant balls are kept inside and the thin lead grid, the lead needle and the lead slime after grinding can be discharged.

The discharge port includes: a discharge homogenizing barrel, a discharge outlet and distribution guide plates. The discharge homogenizing barrel is a round tube, the diameter of the round tube is smaller than the diameter of the discharge hole of the barrel body. The discharge outlet is between the round tube of the discharge homogenizing barrel and the discharge hole of the barrel body. The distribution guide plates are connected between the outside wall of the round tube and the inside wall of the barrel body. A plurality of distribution guide plates are included. When the barrel body is rotating in the forward direction, the distribution guide plates ensure that the material can only output from the barrel body and the material outside the barrel body cannot enter the barrel body, and the lead slime in the barrel body can only overflow from the barrel body.

The waterstop ring is a flange-shaped plate, and the diameter of the center hole of the flange-shaped plate is equal to the diameter of the discharge hole of the barrel body. One side of the flange-shaped plate is connected to the discharge port, and the other side of the flange-shaped plate is connected with a sorting screen; the waterstop ring prevents the water located in an outer discharge flushing water pipe and an inner discharge flushing water pipe from returning to the barrel body.

The bracket device includes: a roller track, rollers and a rack. The roller track is connected outside the main body of the barrel body. The rollers fitted to the roller track are arranged on the roller track. The rollers are connected to the rack.

The discharge device includes: the outer discharge flushing water pipe, the sorting screen, the inner discharge flushing water pipe, a lead slime chute and a lead needle chute. One end of the sorting screen is connected with the waterstop ring of the barrel body, and the other end of the sorting screen is a thin lead grid and lead needle outlet. The diameter of the sorting screen at the end of the thin lead grid and lead needle outlet is larger than the diameter of the sorting screen at the end which is connected with the waterstop ring. The outer discharge flushing water pipe is arranged at the upper end outside the sorting screen. The inner discharge flushing water pipe is arranged in the sorting screen. The spraying distances of the outer discharge flushing water pipe and the inner discharge flushing water pipe are both equal to the length of the sorting screen. The lead slime chute is arranged at the bottom outside the sorting screen. The lead needle chute is arranged below the thin lead grid and lead needle outlet of the sorting screen.

The driver includes: a large ring gear, a driving wheel and a speed reducer. The large ring gear is connected to the round tube of the main body of the barrel body. The driving wheel meshes with the large ring gear. The driving wheel is connected to the output shaft of the speed reducer. The input shaft of the speed reducer is connected to a motor through a belt.

The beneficial effect is that due to the above technical solution, the crushed and sorted thin lead grid containing the lead slime and the metal lead needle enter the barrel body together with the flushing water under the action of the flushing water of the feed hole. Corresponding proportion of 20-60 mm corrosion-resistant and wear-resistant balls are regularly added to the barrel body. When the barrel body is rotating, the material can only enter under the action of the feed homogenizer of the feed throat, and the thin lead grid containing lead slime, the metal lead needle and the corrosion-resistant and wear-resistant balls in the barrel body can no longer output from the feed hole. Since there are polygonal inner lining plates in the barrel body, the thin lead grid containing the lead slime and the metal lead needle reverse and fall off steply in the barrel body, at the same time, the corrosion-resistant and wear-resistant balls rotate to the corresponding height with the barrel body and also fall off in a drop manner. The thin lead grid containing the lead slime and the metal lead needle collide and grind against each other during the falling motion, and the lead slime and the lead paste on the thin lead grid containing the lead slime and the metal lead needle containing the lead slime are crushed off. Due to the flexibility of lead, the collision and grinding in the falling motion, as well as the impact force of water, only make the thin lead grid and the metal lead needle deformed but not break the thin lead grid and the metal lead needle. The lead slime, the thin lead grid and the metal lead needle are separated and sent to the discharge device under the action of the discharge port. The stop orifice plate connected to the discharge port prevents the corrosion-resistant and wear-resistant balls from exiting the discharge device, and the materials processed in the barrel body can output to the outside of the barrel body through the stop orifice plate under the action of the discharge port. The outer opening of the sorting screen of the discharge device is larger than the opening connected with the barrel body. During the rotating process of the barrel body, under the flushing of the water from the outer discharge flushing water pipe and the inner discharge flushing water pipe in the discharging device, the lead slime is washed down and leaked directly through the sorting screen to the lead slime chute below. The lead grid and the metal lead needle gradually tumble from the end of the outer opening of the sorting screen to the lead needle chute along the sorting screen. The clean and impurity-free thin lead grid flows into a silo through the lead needle chute. The lead slime returns to a lead slime tank through the lead slime chute and enters a filter press. Thus the problem that the thin lead grid and the lead needle cannot be completely separated from the lead slime can be solved, and the objective of the present invention is achieved.

Advantages:
1. The thin lead grid separation is complete, clean and impurity-free. It does not need to be melted at high temperature in the melting furnace. It can be directly melted at low temperature to produce high quality hard lead and process into alloy lead.
2. The lead yield rate is high, the amount of ash residue is low, the labor intensity of workers is low, and the valuable metals antimony and tin in the lead grid are effectively utilized.

Figure 1:
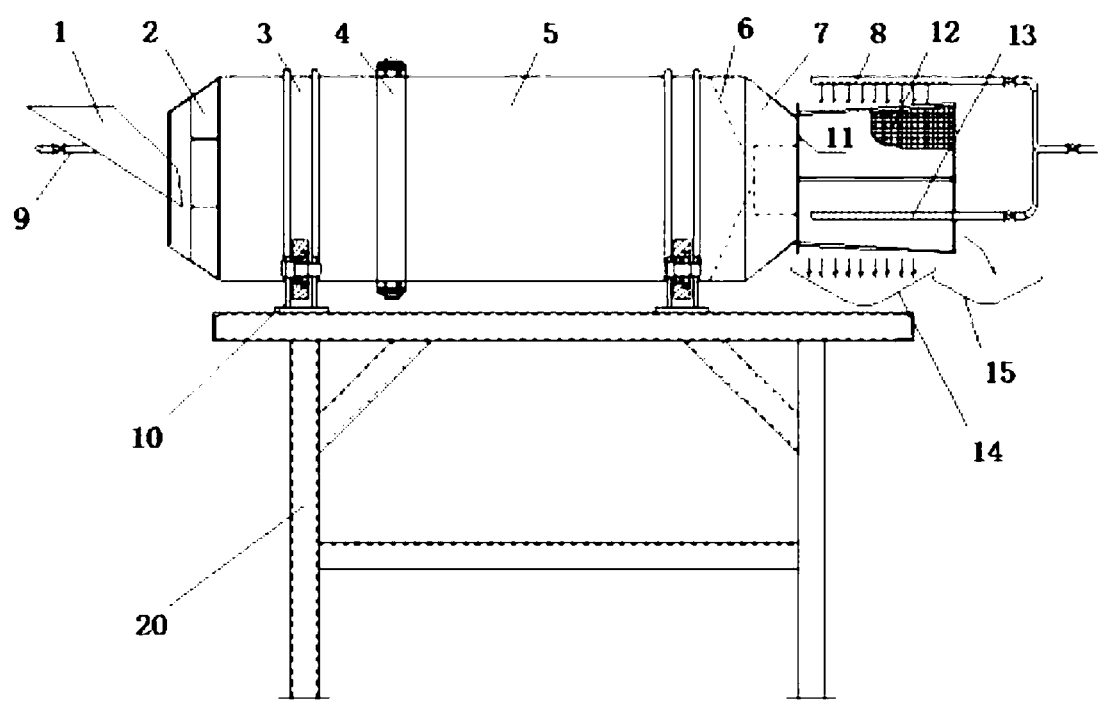
FIG. 1 is a structural diagram of the present invention.
Figure 2:
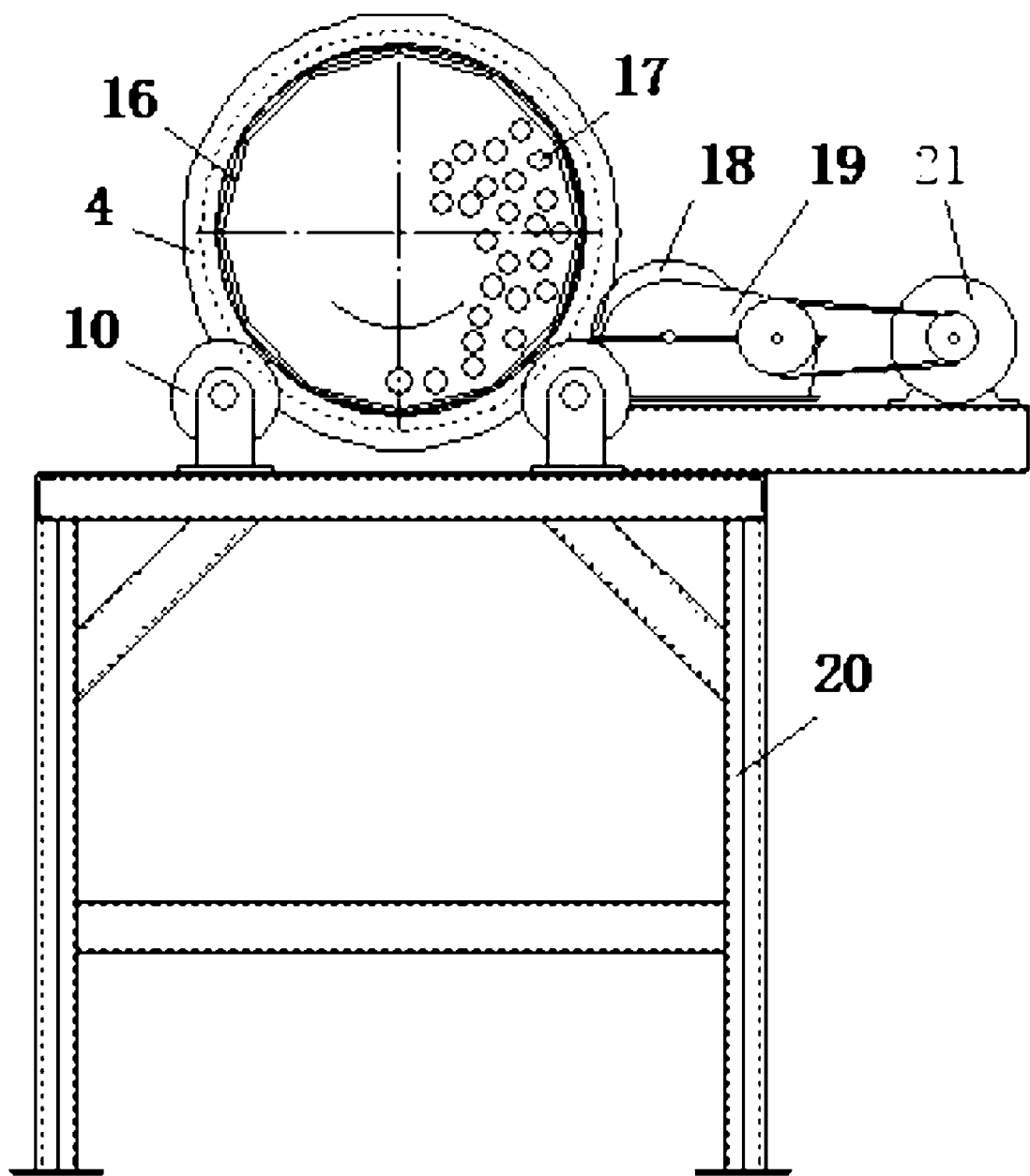
FIG. 2 is a cross-section structural diagram of a side view of FIG. 1.
Figure 3:
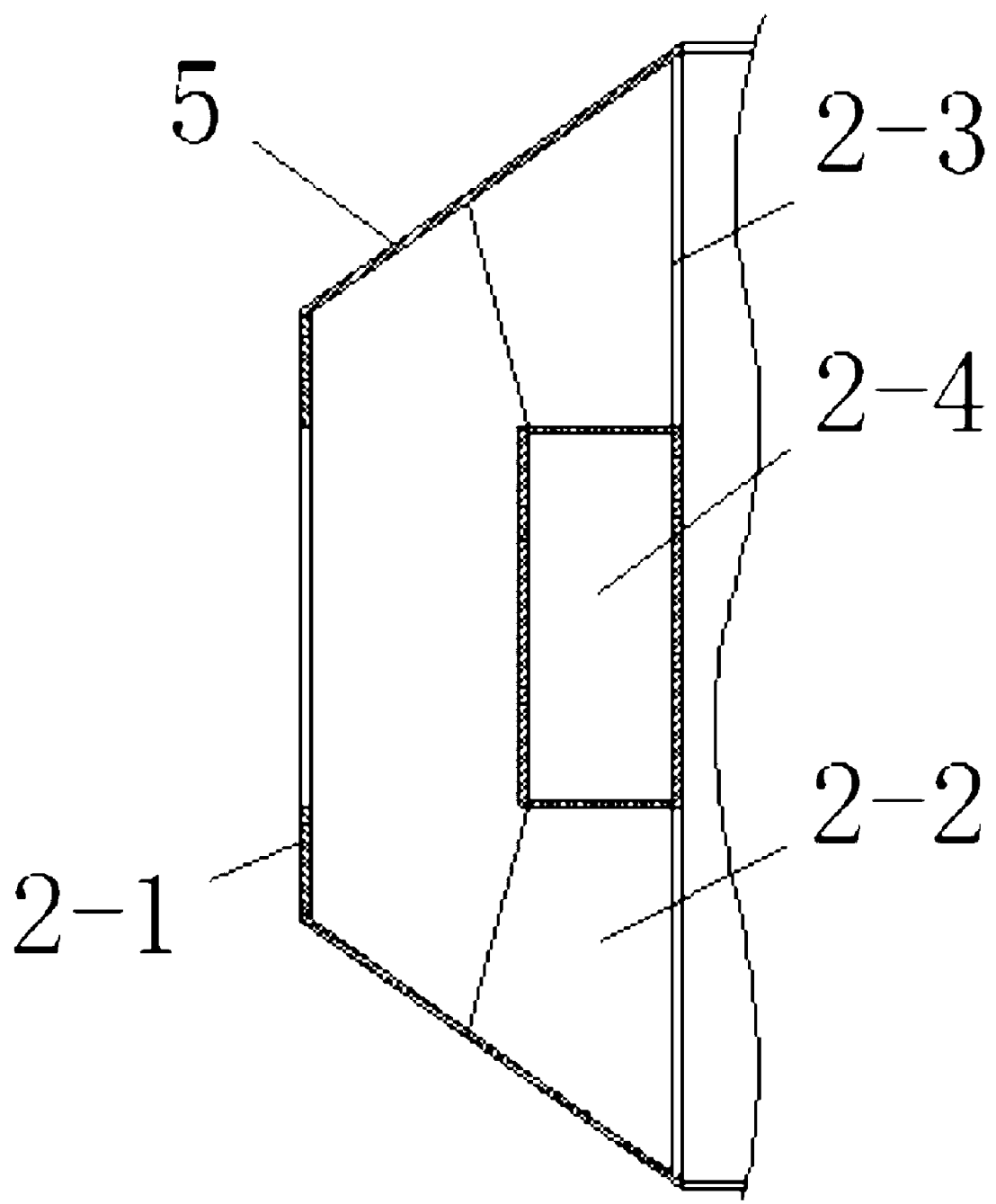
FIG. 3 is a structural diagram of the feed throat of the present invention.
Figure 4:
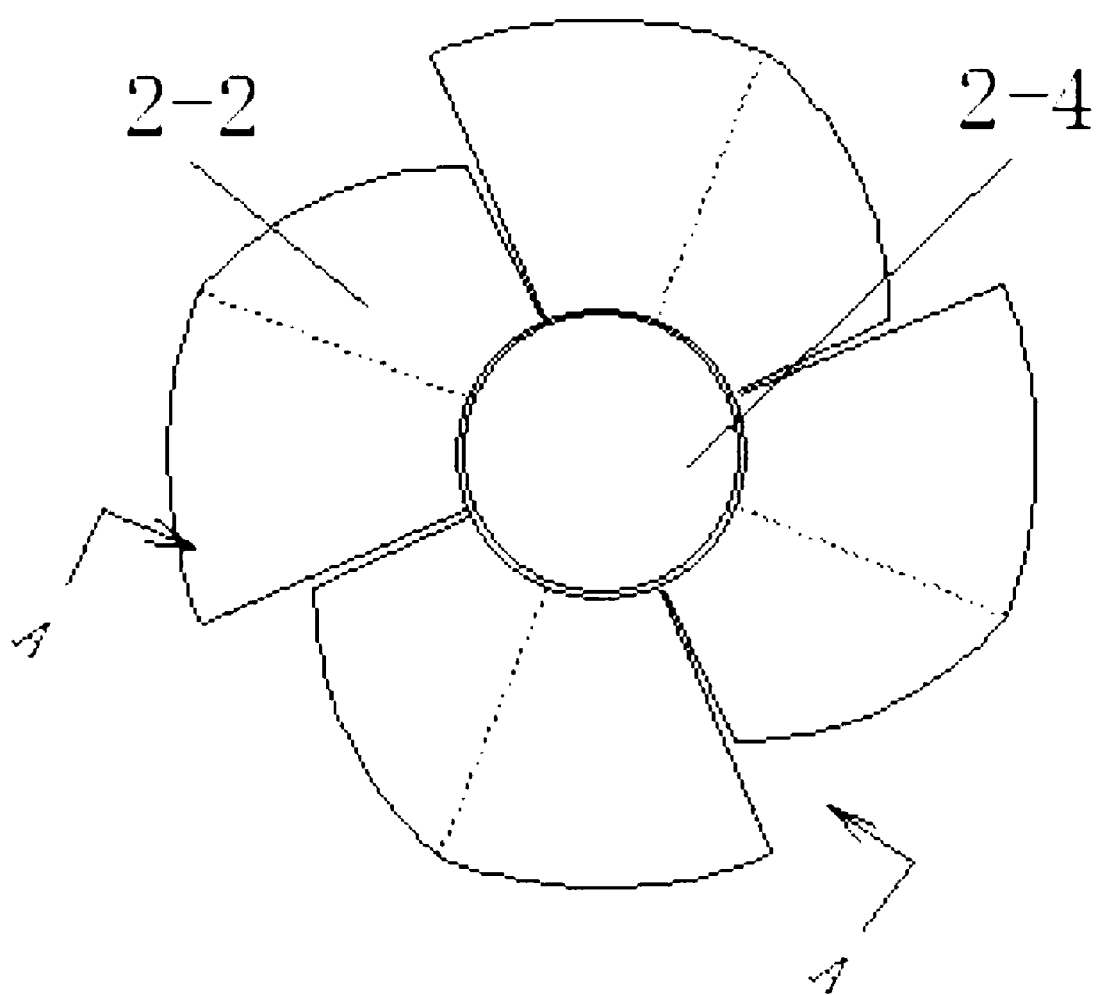
FIG. 4 is a structural diagram of the feed homogenizer of the feed throat of the present invention.
Figure 5:
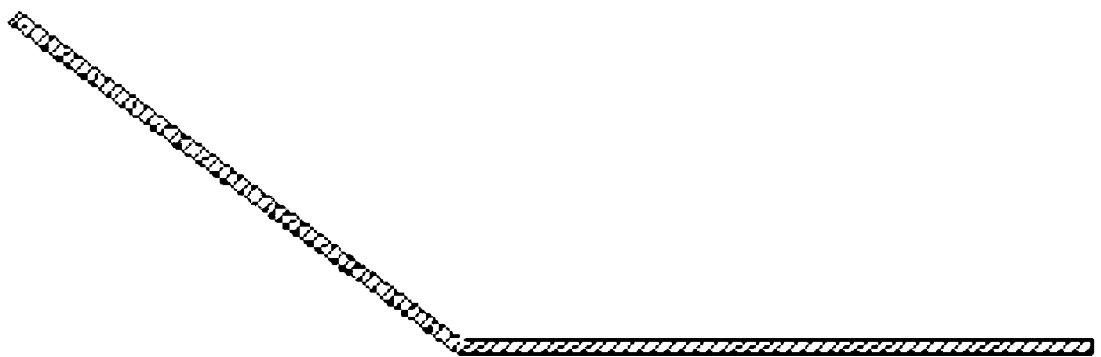
FIG. 5 is a structural diagram of FIG. 4 in A-A direction.
Figure 6:
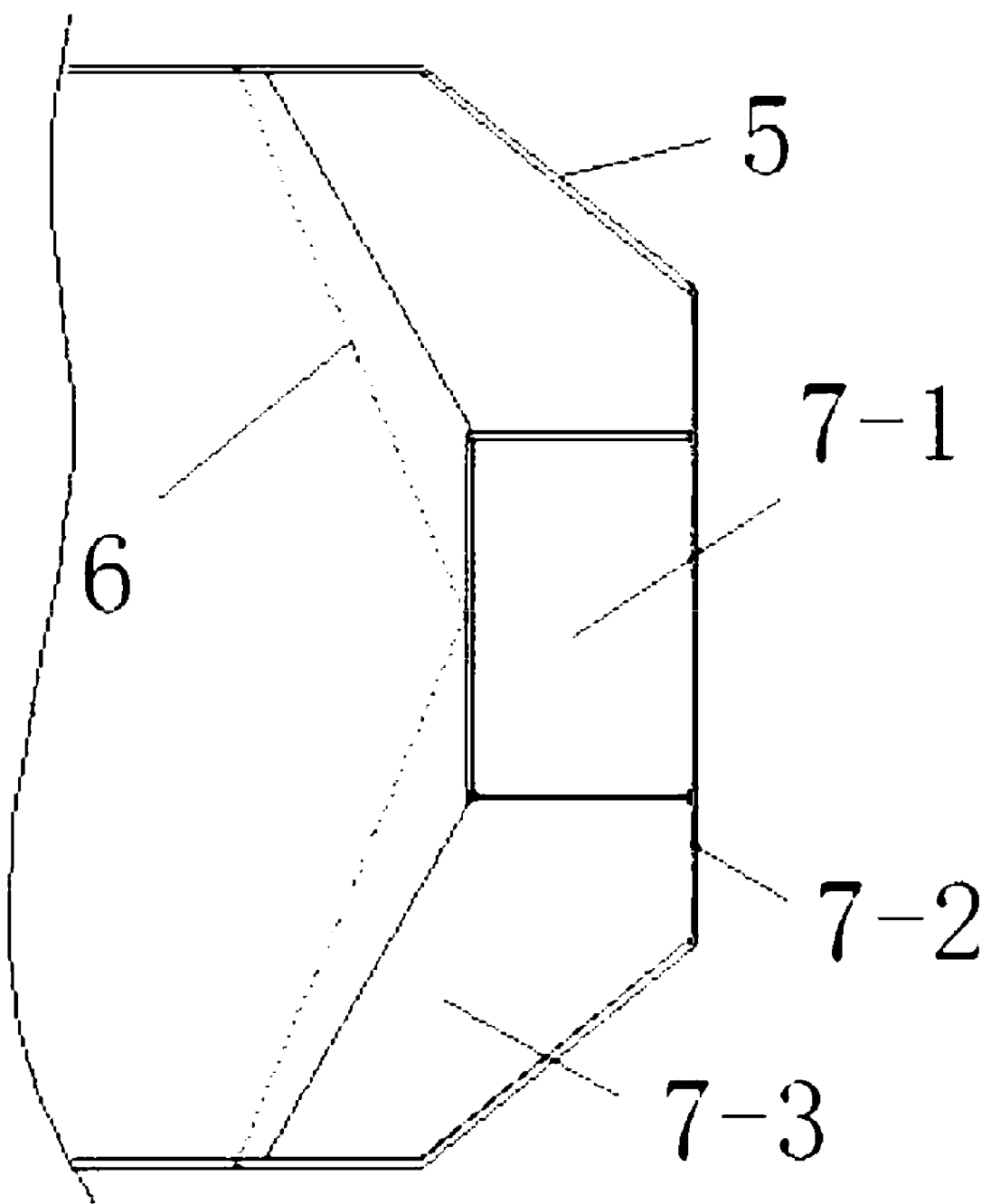
FIG. 6 is a structural diagram of the discharge port of the present invention.
Figure 7:
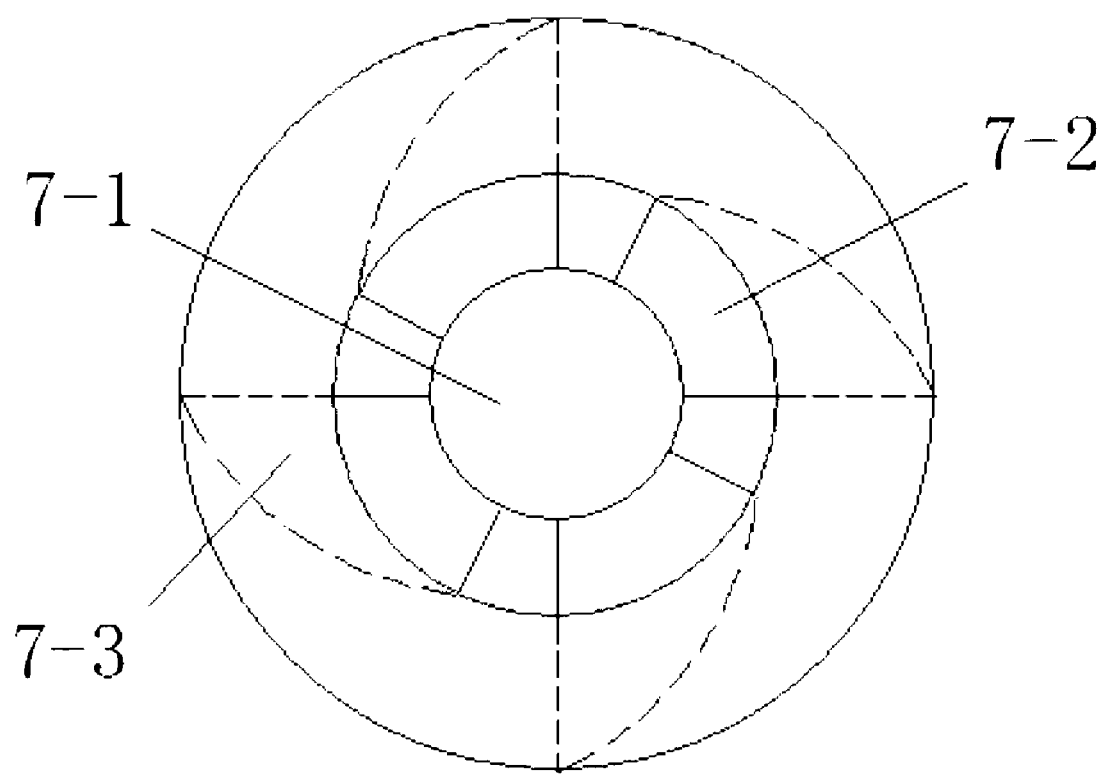
FIG. 7 is a structural diagram of side view of FIG. 6.

In the figures, 1, feed hopper; 2, feed throat; 3, roller track; 4, large ring gear; 5, barrel body; 6, stop orifice plate; 7, discharge port; 8, outer discharge flushing water pipe; 9, feeding flushing water pipe; 10, roller; 11, waterstop ring; 12, sorting screen; 13, inner discharge flushing water pipe; 14, lead slime chute; 15, lead needle chute; 16, drum lining plate; 17, corrosion-resistant and wear-resistant ball; 18, driving wheel; 19, speed reducer; 20, rack; 21, motor; 2-1, anti-spraying flange; 2-2, distribution plate; 2-3, stop baffle; 2-4, feed homogenizing barrel; 7-1, discharge homogenizing barrel; 7-2, discharge outlet; 7-3, distribution guide plate.

DETAILED DESCRIPTION OF THE EMBODIMENTS

The technical solution of the present invention is further described below with the drawings:

Embodiment 1

The separator includes: barrel body 5, corrosion-resistant and wear-resistant balls 17, feed device, bracket device, discharge device and driver. A feed hole is arranged at one end of the barrel body 5, a discharge port is arranged at the other end of the barrel body 5, the feed device is arranged at the feed hole, and the discharge device is arranged at the discharge hole. The barrel body 5 is connected to the bracket device, and the driver is connected to the barrel body 5, and the corrosion-resistant and wear-resistant balls 17 are arranged in the barrel body 5.

The feed device includes: feed hopper 1 and feed flushing water pipe 9. One end of the feed hopper 1 extends to the feed hole of the barrel body 5, and the feed flushing water pipe 9 is connected to the feed hopper 1.

The barrel body 5 includes a feed throat 2, stop orifice plate 6, discharge port 7, waterstop ring 11 and drum lining plates 16. The main body of the barrel body 5 is a round tube, and the two ends of the barrel body 5 are truncated cone-shaped tubes, and the diameter of the external port is smaller than the diameter of the round tube of the main body. The feed throat 2 is connected to an end of the feed hole of the barrel body 5, and the stop orifice plate 6 and the discharge port 7 are connected to an end of the discharge hole in the barrel body 5. The waterstop ring 11 is connected to an end of the discharge hole in the barrel body 5, and the drum lining plate 16 is connected to a position of the main body of the barrel body 5. A plurality of drum lining plates 16 are included, and the drum lining plate is in a rectangular shape. The drum lining plates 16 are connected end to end, and are uniformly distributed in a polygonal shape in the barrel body 5.

The feed throat 2 includes: anti-spraying flange 2-1, stop baffle 2-3 and feed homogenizer. The anti-spraying flange 2-1 and the stop baffle 2-3 are respectively connected at two ends of the truncated cone-shaped tube at a feed end of the barrel body 5, the anti-spraying flange 2-1 is at the feed end of the feed hole, and the stop baffle 2-3 is connected between the round tube of the main body and the truncated cone-shaped tube. The feed homogenizer is connected in the truncated cone-shaped tube. The feed homogenizer includes: distribution plates 2-2 and feed homogenizer barrel 2-4. The feed homogenizer barrel 2-4 is a round tube, the diameter of the round tube is smaller than the diameter of the feed hole of the barrel body 5, one end of the round tube is closed, and the distribution plates 2-2 are connected between the outside wall of the round tube and the inside wall of the barrel body 5. A plurality of distribution plates 2-2 are included, and a shape of the section of the distribution plate 2-2 is bent. When the barrel body 5 is rotating in the forward direction, the distribution plates 2-2 ensure that the material can only enter the barrel body, and lead slime slurry in the barrel body cannot overflow from the barrel body.

The stop orifice plate 6 is a conical plate, and round holes having diameters of 2-12 mm are distributed evenly thereon. The stop orifice plate 6 is fixed in the inner side of the barrel body to ensure that the corrosion-resistant and wear-resistant balls 17 are kept inside and the thin lead grid, the lead needle and the lead slime after grinding can be discharged.

The discharge port 7 includes: discharge homogenizer barrel 7-1, discharge outlet 7-2 and distribution guide plates 7-3. The discharge homogenizer barrel 7-1 is a round tube, the diameter of the round tube is smaller than the diameter of the discharge hole of the barrel body. The discharge outlet 7-2 is between the round tube of the discharge homogenizing barrel and the discharge hole of the barrel body. The distribution guide plates 7-3 are connected between the outside wall of the round tube and the inside wall of the barrel body. A plurality of distribution guide plates 7-3 are included. When the barrel body is rotating in the forward direction, the distribution guide plates 7-3 ensure that the material can only output from the barrel body and the material outside the barrel body cannot enter the barrel body, and the lead slime in the barrel body can only overflow from the barrel body.

The waterstop ring 11 is a flange-shaped plate, and the diameter of the center hole of the flange-shaped plate is equal to the diameter of the discharge hole of the barrel body. One side of the flange-shaped plate is connected to the discharge port, and the other side of the flange-shaped plate is connected with a sorting screen 12. The waterstop ring prevents the water located in an outer discharge flushing water pipe 8 and an inner discharge flushing water pipe 13 from returning to the barrel body.

The bracket device includes: roller track 3, rollers 10 and rack 20. The roller track 3 is connected outside the main body of the barrel body 5. Rollers fitted to the roller track are arranged on the roller track. The rollers 10 are connected to the rack 20.

The discharge device includes: the outer discharge flushing water pipe 8, the sorting screen 12, the inner discharge flushing water pipe 13, lead slime chute 14 and lead needle chute 15. One end of the sorting screen 12 is connected with the waterstop ring 11 of the barrel body 5, and the other end of the sorting screen 12 is an thin lead grid and lead needle outlet. The diameter of the sorting screen 12 at the end of the thin lead grid and lead needle outlet is larger than the diameter of the sorting screen 12 at the end connected with the waterstop ring 11. The outer discharge flushing water pipe 8 is arranged at the upper end outside the sorting screen 12. The inner discharge flushing water pipe 13 is arranged in the sorting screen 12. The spraying distances of the outer discharge flushing water pipe 8 and the inner discharge flushing water pipe 13 are both equal to the length of the sorting screen 12. The lead slime chute 14 is arranged at the bottom outside the sorting screen 12. The lead needle chute 15 is arranged below the thin lead grid and lead needle outlet of the sorting screen 12.

The driver includes: large ring gear 4, driving wheel 18 and speed reducer 19. The large ring gear 4 is connected to the round tube of the main body of the barrel body 5. The driving wheel 18 meshes with the large ring gear 4. The driving wheel is connected to the output shaft of the speed reducer 19. The input shaft of the speed reducer 19 is connected to motor 21 through a belt.

What is claimed is:

1. A lead needle and lead slime separator for treating a thin lead grid of a waste lead-acid storage battery, comprising:
    a barrel body,
    corrosion-resistant and wear-resistant balls,
    a feed device,
    a bracket device,
    a discharge device and a driver;
    wherein a feed hole is arranged at one end of the barrel body, a discharge hole is arranged at the other end of the barrel body;
    the feed device is arranged at the feed hole, and the discharge device is arranged at the discharge hole; and
    the bracket device is connected to the barrel body, the driver is connected to the barrel body, and the corrosion-resistant and wear-resistant balls are arranged in the barrel body and
    wherein the barrel body comprises:
        a feed throat,
        a stop orifice plate,
        a discharge port,
        a waterstop ring and
        a plurality of drum lining plates;
        a main body of the barrel body is a first round tube,
        two ends of the barrel body are truncated cone-shaped tubes, and a diameter of an external port of the barrel body is smaller than a diameter of the first round tube of the main body;
        the feed throat is connected to an end of the feed hole of the barrel body, and the stop orifice plate and the discharge port are connected to an end of the discharge hole in the barrel body;
        the waterstop ring is connected to the end of the discharge hole in the barrel body, and each of the plurality of the drum lining plates is connected to a position of the main body of the barrel body;
        each of the plurality of the drum lining plates is in a rectangular shape;
        the plurality of the drum lining plates are connected end to end, and are uniformly distributed in a polygonal shape in the barrel body.

2. The lead needle and lead slime separator for treating the thin lead grid of the waste lead-acid storage battery of claim 1, wherein the feed device comprises:
    a feed hopper and
    a feed flushing water pipe;
    one end of the feed hopper extends to the feed hole of the barrel body, and the feed flushing water pipe is connected to the feed hopper.

3. The lead needle and lead slime separator for treating the thin lead grid of the waste lead-acid storage battery of claim 1, wherein the bracket device comprises:
    a roller track,
    rollers and
    a rack;
    the roller track is connected outside the main body of the barrel body;
    the rollers fitted to the roller track are arranged on the roller track;
    the rollers are connected to the rack.

4. The lead needle and lead slime separator for treating the thin lead grid of the waste lead-acid storage battery of claim 1, wherein the discharge device comprises:
    an outer discharge flushing water pipe,
    a sorting screen,
    an inner discharge flushing water pipe,
    a lead slime chute and a lead needle chute;
    a first end of the sorting screen is connected with the waterstop ring of the barrel body, and a second end of the sorting screen is a thin lead grid and lead needle outlet;
    a first diameter of the sorting screen at the second end of the sorting screen is larger than a second diameter of the sorting screen at the first end of the sorting screen;
    the outer discharge flushing water pipe is arranged at an upper end outside the sorting screen;
    the inner discharge flushing water pipe is arranged in the sorting screen;
    spraying distances of the outer discharge flushing water pipe and the inner discharge flushing water pipe are both equal to a length of the sorting screen;
    the lead slime chute is arranged at a bottom outside the sorting screen;
    the lead needle chute is arranged below the thin lead grid and lead needle outlet of the sorting screen.

5. The lead needle and lead slime separator for treating the thin lead grid of the waste lead-acid storage battery of claim 1, wherein the driver comprises:
    a large ring gear,
    a driving wheel and a speed reducer;
    the large ring gear is connected to a first round tube of the main body of the barrel body;
    the driving wheel meshes with the large ring gear;
    the driving wheel is connected to an output shaft of the speed reducer;
    an input shaft of the speed reducer is connected to a motor through a belt.

6. The lead needle and lead slime separator for treating the thin lead grid of the waste lead-acid storage battery of claim 1, wherein the feed throat comprises:
an anti-spraying flange,
a stop baffle and
a feed homogenizer;
the anti-spraying flange and the stop baffle are respectively connected at two ends of the truncated cone-shaped tube at an feed end of the barrel body, the anti-spraying flange is at the feed end, and the stop baffle is connected between the first round tube of the main body and the truncated cone-shaped tube;
the feed homogenizer is connected in the truncated cone-shaped tube;
the feed homogenizer comprises:
a plurality of distribution plates and
a feed homogenizer barrel,
wherein the feed homogenizer barrel is a second round tube, an diameter of the second round tube of the feed homogenizer barrel is smaller than a diameter of the feed hole of the barrel body, one end of the second round tube of the feed homogenizer barrel is closed, the plurality of distribution plates are connected between an outside wall of the second round tube of the feed homogenizer barrel and an inside wall of the barrel body, and a shape of a section of each of the plurality of the distribution plate is bent;
when the barrel body is rotating in a forward direction, the distribution plates ensure that material only enters the barrel body and lead slime slurry in the barrel body does not overflow from the barrel body.

7. The lead needle and the lead slime separator for treating the thin lead grid of the waste lead-acid storage battery of claim 1,
wherein the stop orifice plate is a conical plate, and round holes having diameters of 2-12 mm are distributed evenly on the stop orifice plate;
the stop orifice plate is fixed in an inner side of the barrel body to ensure that the corrosion-resistant and wear-resistant balls are kept inside and thin lead grid, lead needle and lead slime after grinding are discharged.

8. The lead needle and lead slime separator for treating the thin lead grid of the waste lead-acid storage battery of claim 1, wherein the discharge port comprises:
a discharge homogenizer barrel,
a discharge outlet and a plurality of distribution guide plates;
the discharge homogenizer barrel is a third round tube, the diameter of the third round tube of the discharge homogenizer barrel is smaller than a diameter of the discharge hole of the barrel body;
the discharge outlet is between the third round tube of the discharge homogenizing barrel and the discharge hole of the barrel body;
the plurality of distribution guide plates are connected between an outside wall of the third round tube of the discharge homogenizer barrel and an inside wall of the barrel body;
when the barrel body is rotating in the forward direction, the plurality of distribution guide plates ensure that the material only outputs from the barrel body, and material outside the barrel body does not enter the barrel body, and the lead slime in the barrel body only overflows from the barrel body.

9. The lead needle and lead slime separator for treating the thin lead grid of the waste lead-acid storage battery of claim 1,
wherein the waterstop ring is a flange-shaped plate, and a diameter of a center hole of the flange-shaped plate is equal to a diameter of the discharge hole of the barrel body;
one side of the flange-shaped plate is connected to the discharge port, and the other side of the flange-shaped plate is connected with the sorting screen;
the waterstop ring prevents water located in an outer discharge flushing water pipe and an inner discharge flushing water pipe from returning to the barrel body.

10. A lead needle and lead slime separator for treating a thin lead grid of a waste lead-acid storage battery, comprising:
a barrel body,
corrosion-resistant and wear-resistant balls,
a feed device,
a bracket device,
a discharge device and a driver;
wherein a feed hole is arranged at one end of the barrel body, a discharge hole is arranged at the other end of the barrel body;
the feed device is arranged at the feed hole, and the discharge device is arranged at the discharge hole;
the bracket device is connected to the barrel body, the driver is connected to the barrel body, and the corrosion-resistant and wear-resistant balls are arranged in the barrel body;
wherein the discharge device comprises:
an outer discharge flushing water pipe,
a sorting screen,
an inner discharge flushing water pipe,
a lead slime chute and
a lead needle chute;
wherein a first end of the sorting screen is connected with a waterstop ring of the barrel body, and a second end of the sorting screen is a thin lead grid and lead needle outlet;
a first diameter of the sorting screen at the second end of the sorting screen is larger than a second diameter of the sorting screen at the first end of the sorting screen;
the outer discharge flushing water pipe is arranged at an upper end outside the sorting screen;
the inner discharge flushing water pipe is arranged in the sorting screen;
spraying distances of the outer discharge flushing water pipe and the inner discharge flushing water pipe are both equal to a length of the sorting screen;
the lead slime chute is arranged at a bottom outside the sorting screen; and
the lead needle chute is arranged below the thin lead grid and lead needle outlet of the sorting screen.

11. The lead needle and lead slime separator for treating the thin lead grid of the waste lead-acid storage battery of claim 10, wherein the feed device comprises:
a feed hopper and
a feed flushing water pipe;
wherein one end of the feed hopper extends to the feed hole of the barrel body, and the feed flushing water pipe is connected to the feed hopper.

12. The lead needle and lead slime separator for treating the thin lead grid of the waste lead-acid storage battery of claim 10, wherein the bracket device comprises:
a roller track,
rollers and
a rack;
wherein the roller track is connected outside the main body of the barrel body;

the rollers fitted to the roller track are arranged on the roller track; and the rollers are connected to the rack.

13. The lead needle and lead slime separator for treating the thin lead grid of the waste lead-acid storage battery of claim 10, wherein the driver comprises:
   a large ring gear,
   a driving wheel and
   a speed reducer;
   the large ring gear is connected to a first round tube of the main body of the barrel body;
   the driving wheel meshes with the large ring gear;
   the driving wheel is connected to an output shaft of the speed reducer; and
   an input shaft of the speed reducer is connected to a motor through a belt.

14. The lead needle and lead slime separator for treating the thin lead grid of the waste lead-acid storage battery of claim 10, wherein the barrel body comprises:
   a feed throat,
   a stop orifice plate,
   a discharge port,
   the waterstop ring and
   a plurality of drum lining plates;
   a main body of the barrel body is a first round tube,
   wherein two ends of the barrel body are truncated cone-shaped tubes, and a diameter of an external port of the barrel body is smaller than a diameter of the first round tube of the main body;
   the feed throat is connected to an end of the feed hole of the barrel body, and the stop orifice plate and the discharge port are connected to an end of the discharge hole in the barrel body;
   the waterstop ring is connected to the end of the discharge hole in the barrel body, and each of the plurality of the drum lining plates is connected to a position of the main body of the barrel body; and
   each of the plurality of the drum lining plates is in a rectangular shape; and
   the plurality of the drum lining plates are connected end to end, and are uniformly distributed in a polygonal shape in the barrel body.

15. The lead needle and lead slime separator for treating the thin lead grid of the waste lead-acid storage battery of claim 14, wherein the feed throat comprises:
   an anti-spraying flange,
   a stop baffle and
   a feed homogenizer;
   the anti-spraying flange and the stop baffle are respectively connected at two ends of the truncated cone-shaped tube at a feed end of the barrel body, the anti-spraying flange is at the feed end, and the stop baffle is connected between the first round tube of the main body and the truncated cone-shaped tube; and
   the feed homogenizer is connected in the truncated cone-shaped tube.

16. The lead needle and lead slime separator for treating the thin lead grid of the waste lead-acid storage battery of claim 15, wherein the feed homogenizer comprises:
   a plurality of distribution plates and
   a feed homogenizer barrel,
   wherein the feed homogenizer barrel is a second round tube, an diameter of the second round tube of the feed homogenizer barrel is smaller than a diameter of the feed hole of the barrel body, one end of the second round tube of the feed homogenizer barrel is closed, and
   wherein the plurality of distribution plates are connected between an outside wall of the second round tube of the feed homogenizer barrel and an inside wall of the barrel body, and a shape of a section of each of the plurality of the distribution plate is bent; and
   when the barrel body is rotating in a forward direction, the distribution plates ensure that material only enters the barrel body and lead slime slurry in the barrel body does not overflow from the barrel body.

17. The lead needle and the lead slime separator for treating the thin lead grid of the waste lead-acid storage battery of claim 14,
   wherein the stop orifice plate is a conical plate, and round holes having diameters of 2-12 mm are distributed evenly on the stop orifice plate;
   the stop orifice plate is fixed in an inner side of the barrel body to ensure that the corrosion-resistant and wear-resistant balls are kept inside and thin lead grid, lead needle and lead slime after grinding are discharged.

18. The lead needle and lead slime separator for treating the thin lead grid of the waste lead-acid storage battery of claim 14,
   wherein the waterstop ring is a flange-shaped plate, and a diameter of a center hole of the flange-shaped plate is equal to a diameter of the discharge hole of the barrel body;
   one side of the flange-shaped plate is connected to the discharge port, and the other side of the flange-shaped plate is connected with the sorting screen;
   the waterstop ring prevents water located in an outer discharge flushing water pipe and an inner discharge flushing water pipe from returning to the barrel body.

19. The lead needle and lead slime separator for treating the thin lead grid of the waste lead-acid storage battery of claim 10, wherein the discharge port comprises:
   a discharge homogenizer barrel,
   a discharge outlet and
   a plurality of distribution guide plates;
   wherein the discharge homogenizer barrel is a third round tube and the diameter of the third round tube of the discharge homogenizer barrel is smaller than a diameter of the discharge hole of the barrel body.

20. The lead needle and lead slime separator for treating the thin lead grid of the waste lead-acid storage battery of claim 19, wherein
   the discharge outlet is between the third round tube of the discharge homogenizing barrel and the discharge hole of the barrel body;
   the plurality of distribution guide plates are connected between an outside wall of the third round tube of the discharge homogenizer barrel and an inside wall of the barrel body;
   when the barrel body is rotating in the forward direction, the plurality of distribution guide plates is configured to ensure that the material only outputs from the barrel body, and material outside the barrel body does not enter the barrel body, and the lead slime in the barrel body only overflows from the barrel body.

\* \* \* \* \*